US010895291B2

(12) United States Patent
Prouzet

(10) Patent No.: US 10,895,291 B2
(45) Date of Patent: Jan. 19, 2021

(54) ROTOR BRAKE

(71) Applicant: Ratier-Figeac SAS, Figeac (FR)

(72) Inventor: Bertrand Prouzet, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 20 days.

(21) Appl. No.: 16/289,777

(22) Filed: Mar. 1, 2019

(65) Prior Publication Data

US 2020/0018366 A1 Jan. 16, 2020

(30) Foreign Application Priority Data

Jul. 13, 2018 (EP) .................................... 18305951

(51) Int. Cl.
*F16D 55/224* (2006.01)
*F16D 65/18* (2006.01)
*F16D 121/20* (2012.01)
*F16D 127/06* (2012.01)

(52) U.S. Cl.
CPC ......... *F16D 55/2245* (2013.01); *F16D 65/18* (2013.01); *F16D 2121/20* (2013.01); *F16D 2127/06* (2013.01)

(58) Field of Classification Search
CPC .. F16D 55/224; F16D 55/2245; F16D 55/225; F16D 55/228; F16D 65/18; F16D 2121/18; F16D 2121/20; F16D 2121/22; F16D 55/2265; F16D 55/22655; F16D 55/227; F16D 2127/06; F16D 63/002; F16D 63/006
USPC ................................. 188/72.3, 166, 170, 171
See application file for complete search history.

(56) References Cited

U.S. PATENT DOCUMENTS 3,045,782 A * 7/1962 Hansen ................ H02K 7/1023
188/171
6,077,042 A 6/2000 Pancotti et al.
6,193,464 B1 2/2001 Nyhus et al.
9,157,496 B2 * 10/2015 Prouzet ................... F16D 55/22
(Continued)

FOREIGN PATENT DOCUMENTS

DE 102013021769 A1 * 6/2014 ............. F16D 59/02
EP 0894712 A2 2/1999
EP 0894712 A3 2/1999
(Continued)

OTHER PUBLICATIONS

EPO translation, WO 2015/177767. (Year: 2014).*
Extended European Search Report for International Application No. 18305951.8 dated Jan. 30, 2019, 7 pages.

*Primary Examiner* — Thomas J Williams
(74) *Attorney, Agent, or Firm* — Cantor Colburn LLP

(57) ABSTRACT

A brake unit comprises said rotor disc rotatable about a central axis of rotation and a first brake pad mounting element having a first end and a second end and a longitudinal outer, side, surface extending there between, wherein a first brake pad is provided at said first end of said first brake pad mounting element and positioned facing a first face of said rotor disc. The first brake pad mounting element comprises a first locking feature provided on its outer, side, surface. The brake unit further comprises first locking element that pivots about pivot and that is movable about said pivot axis so that a locking feature of said locking element can come into contact with, or be moved away from said outer, side, surface of said first brake pad mounting element.

15 Claims, 5 Drawing Sheets

(56) References Cited

U.S. PATENT DOCUMENTS

2014/0231188 A1    8/2014  Prouzet
2016/0207746 A1*   7/2016  Heil .................. F16D 48/06

FOREIGN PATENT DOCUMENTS

| EP | 3056400 A1 | 8/2016 |
| EP | 3145763 A1 | 3/2017 |
| WO | 2015177767 A1 | 11/2015 |
| WO | 2017108527 A1 | 6/2017 |

* cited by examiner

ROTOR BRAKE

This application claims priority to European Patent Application No. 18305951.8 filed Jul. 13, 2018, the entire contents of which is incorporated herein by reference.

The present disclosure relates to a brake unit for braking a rotor, a safety braking system comprising the brake unit, and a method for braking a rotor.

BACKGROUND

In a helicopter or other rotary wing aircraft, a rotor brake is used to stop a rotor connected to the wings when the helicopter is on the ground. If the brake is engaged during flight, catastrophic failure can occur. Various safety systems have therefore been implemented in the past to ensure that the brake unit does not apply braking force to the rotor during flight.

Some known systems include a first barrier for preventing unwanted activation of the brake. These systems may provide a solenoid valve to prevent hydraulic pressure being transmitted to the brake pads of the brake unit.

Other systems use a different method. For example, EP 0894712 A2 discloses a system for retaining the brake unit away from the rotor during flight so that if the brake unit is undesirably activated during flight, it does not brake the rotor.

To increase passenger and equipment safety, there is a desire to improve the safety of a rotor brake for a rotary wing aircraft to reduce the possibility of braking during flight.

SUMMARY

According to a first aspect, a brake unit for braking a rotor disc is described, comprising the rotor disc that is rotatable about a central axis of rotation. A first brake pad mounting means is also provided having a first end and a second end and a longitudinal outer, side, surface extending there between. A first brake pad is provided at the first end of the first brake pad mounting means and positioned facing a first face of the rotor disc, and the first brake pad mounting means comprises a first brake pad locking feature provided on its the outer, side, surface. The brake unit further comprises first locking means configured to pivot about an axis, the first locking means being configured to be movable about the pivot axis so that a locking feature of the locking means can come into contact with, or be moved away from the outer, side, surface of the first brake pad mounting means. In a first position, the first locking means is configured to be in contact with and engaged with the first locking feature, thereby preventing movement of the first brake pad towards the face of the rotor disc, and in a second position, the first locking means is configured to be disengaged from the locking feature to thereby permit movement of the braking pad towards the face of the rotor disc.

In some examples, the brake unit further comprises a second brake pad mounting means having a first end and a second end and a longitudinal outer surface extending there between, wherein a second brake pad is provided at the first end of the second brake pad mounting means and positioned facing a second, opposite face of the rotor disc and wherein the second brake pad mounting means comprises a second brake pad locking feature provided on its the outer, side, surface. The brake unit may further comprise second locking means configured to pivot about an axis, the second locking means being configured to be movable about the pivot axis so that a locking feature of the second locking means can come into contact with, or be moved away from the outer, side, surface of the second brake pad mounting means. In a first position, the second locking means may be configured to be in contact with and engaged with the second locking features, thereby preventing movement of the second brake pad towards the second face of the rotor disc, and in a second position, the second locking means may be configured to be disengaged from the locking features to thereby permit movement of the second braking pad towards the second face of the rotor disc.

According to another aspect, instead of having a second brake pad mounting means provided at the opposite side of the rotor disc, the brake unit may instead further comprise a static brake pad positioned facing a second, opposite face of the rotor disc, wherein the rotor disc is a floating rotor disc configured to be axially movable along its central axis under pressure from the first brake pad mounting means such that when the first brake pad mounting means contacts the floating rotor disc the rotor disc is moved axially into contact with the static brake pad.

The central axis and the pivot axis may be parallel to each other.

The brake unit may further comprise biasing means for biasing the locking means to the first position.

The biasing means may be a spring element.

The brake unit may further comprising an actuator for selectively pivoting the locking means to the second position.

The actuator may be a solenoid.

Each, or only one of, the first and second brake pad mounting means may comprise braking biasing means configured to bias a respective brake pad away from the rotor disc.

The brake unit may comprise a position sensor for detecting whether the brake unit is in the first position or the second position.

The locking feature of each, or only one of, the locking means may comprise a hook and the locking features of the brake pad mounting means may comprise a notch. Movement of the locking means from the first to the second position may result in disengagement of the hook with the notch.

The brake unit may further comprise a mechanical link to the connect the locking means together. In some examples, the mechanical link may be a crossbar.

According to another aspect, there is provided a safety braking system comprising the brake unit of any of the above aspects, and a drive system coupled to the brake system; wherein the drive system is configured to apply force to the first and second brake pad mounting means to bias the first and second brake pads into contact with the rotor disc.

The drive system of the safety braking system may be a hydraulic drive system.

The drive system may be controlled independently from the pivoting movement of the locking means.

According to another aspect, there is provided a method of braking a rotor, the method comprising: providing a brake unit as described above; providing a drive system for controlling the movement of the brake pad mounting means when the first and second locking means are in the second position; moving the locking means to the second position; and activating the drive system to bias the brake pads against the rotor.

The method may comprise the steps of biasing the brake pad mounting means away from the rotor disc when the drive system is inactive.

The method may comprise the steps of: biasing the locking means towards the first position such that the locking means become engaged with the first and second locking features when the drive system is inactive and the brake pad mounting means are biased away from the rotor disc.

DESCRIPTION OF THE FIGURES

Certain examples of a new type of brake unit will now be described in greater detail by way of example only and with reference to the accompanying drawings in which.

DETAILED DESCRIPTION

Figure 1:
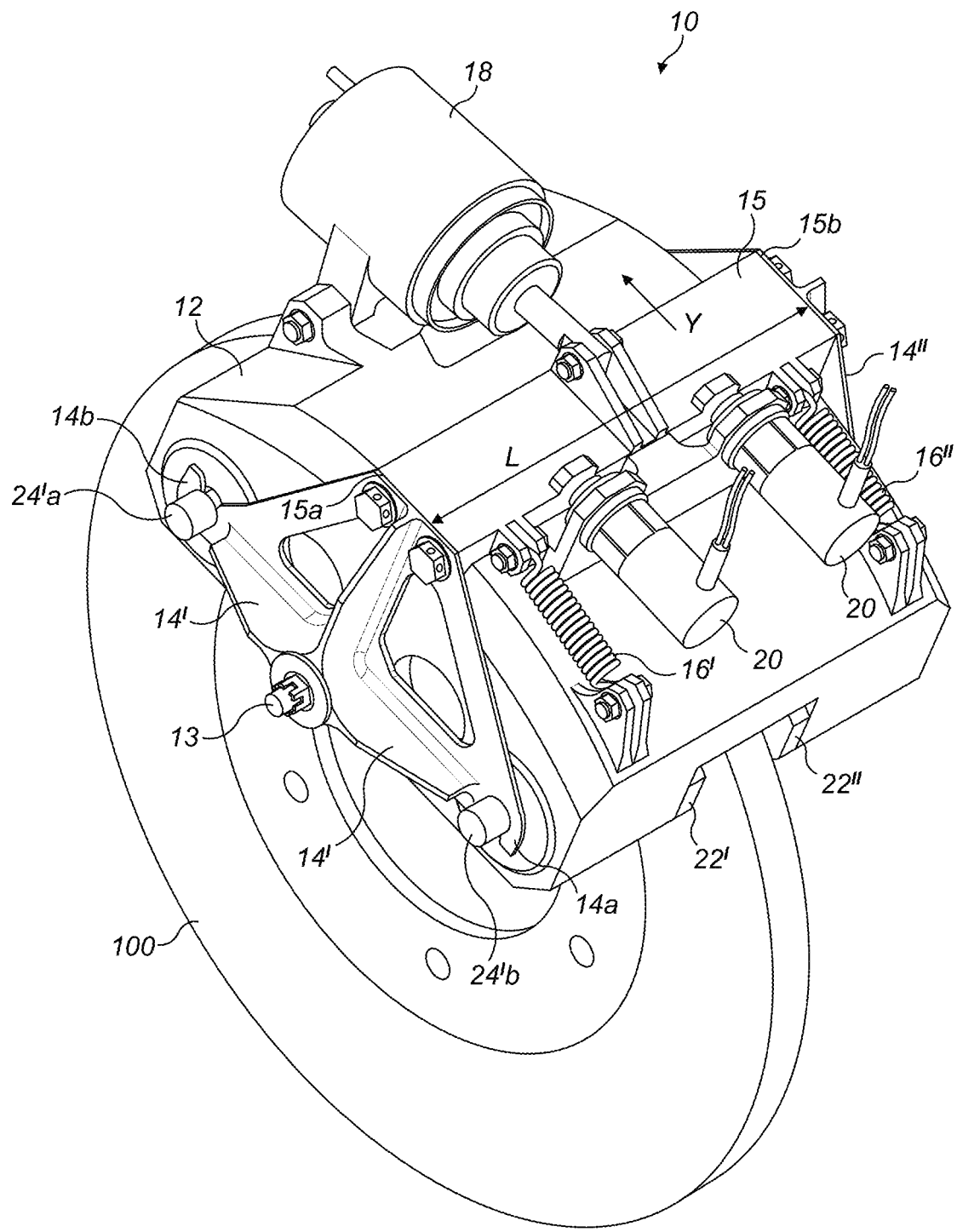
FIG. 1 shows a perspective view of a brake unit positioned adjacent a rotor in a locked position.

FIG. 1 shows a brake unit 10 positioned adjacent to and configured for use with a rotor disc 100. The brake unit 10 is fixed so as to be positioned relative to the rotor disc 100 by any suitable means, for example by bolting the brake unit 10 to an airframe. The rotor disc 100 may be connected to a shaft that spins the wings of a rotary wing aircraft (e.g. a helicopter), such that the rotor disc 100 spins with the rotary wings about a central axis and, when the brake unit 10 clamps the rotor disc 100, the rotor disc 100 is braked and the wings of the aircraft come to a stop.

The brake unit 10 may comprise a U-shaped housing 12 with first and second brake pads 22', 22" positioned between the arms of the U-shape. These brake pads 22', 22" are for clamping against/contacting each side of a rotor disc 100 that is provided between the brake pads, so as to provide a braking force on both faces of the rotor disc 100. The first 22' and second brake pads 22" provided on either (opposite) side of the rotor disc 100 may each be mounted on at least a first and second brake pad mounting means 24', 24" (obscured by the housing in FIG. 1) respectively. These brake pad mounting means 24', extend through the arms of the U-shaped housing as shown in at least FIG. 2A and described in greater detail later. The first brake pad 22' is therefore positioned so as to face a first side or face of the rotor disc 100, while the second brake pad 22" is positioned to face a second, opposite, side or face of the rotor disc 100. In some examples, more than one brake pad 22', 22" may be provided on each side of the rotor disc 100. In some examples, the brake pad 22' and brake pad mounting means 24' may be formed integrally.

In the examples shown in the figures (although, as explained below, other examples may have a static brake pad provided at one side) both sides of the brake unit are the same as each other and so the following description is provided regarding the first side of the brake unit, with the understanding that this is repeated also on the second side of the brake unit.

In the examples shown and described herein, two of these first brake pad mounting means 24' (shown as 24'a and 24'b in FIG. 1) may be provided on the first (and/or second) side of the rotor disc 100. The examples described herein are not limited to this, however, and in some examples only one brake pad mounting means 24', 24" may be provided on each side of the rotor disc 100 to effect the braking.

A first locking means 14' is mounted, at a pivot point 13, to the outside surface of the U-shaped housing 12. The pivot point 13 is positioned towards the upper part of the arm of the U-shape. This locking means 14' is therefore movable about this pivot point 13 so as to allow for the locking and prevention of movement of the brake pads 22', 22" towards the faces of the rotor disc 100 (as described in detail below).

Figure 3:
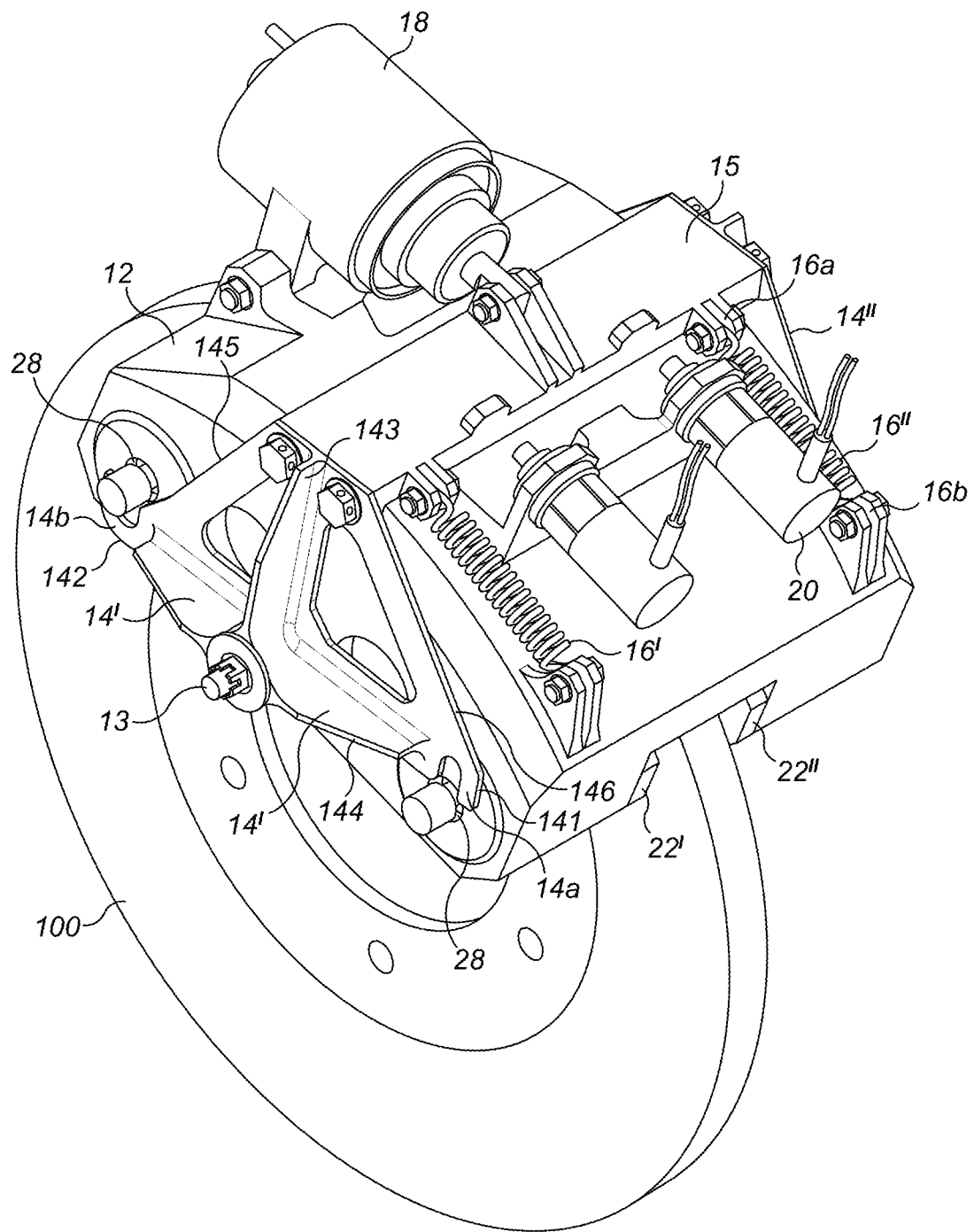
FIG. 3 shows a perspective view of the brake unit in an unlocked position.

In some examples, each of the locking means 14', 14" may comprise a plate. As shown in FIG. 3, the locking means 14' on each side of the rotor disc 100 comprises a substantially triangular plate that has first 141, second 142 and third 143 angled corners. A first side 144 of the triangular plate extends between the first and second corners 141, 142, a second side 145 of the triangle extends between the second corner 142 and the third corner 143 and a third side 146 of the triangle extends between the third corner 143 and the first corner 141.

A first locking feature 14a is provided at the first corner 141 of the triangular plate 14' and in some examples, as seen in FIGS. 1, 3, 4A and 5A, a second locking feature 14b may also be provided at the second corner 142 of the plate 14'. This locking feature 14a, 14b may be a latch or hook. In the examples wherein two latches or hooks 14a, 14b are provided, one hook will curve in a first direction (e.g. upwards) and the other hook will curve in the opposite direction (e.g. downwards). The hooks provided on each plate, however, must also either both curve clockwise or both curve anti-clockwise. In an example wherein the plate is configured to pivot in an anti-clockwise direction, the hooks are curved to extend in the opposite, i.e. clockwise direction and vice versa.

The pivot point 13 is provided between these first and second corners 141, 142 of the substantially triangular shaped locking means 14'.

As described in detail below, the plates 14', 14" are therefore configured to contact and lock with (i.e. hook around a notch of) the outer surface of the brake pad mounting means 24'. In the examples shown in the figures, the plate 14' provided on the first side of the rotor disc 100 is configured to contact and lock with two brake pad mounting means 24'a, 24'b.

In some examples, both of the brake pad mounting means 24' provided on one side of the rotor disc 100 have the same brake pad 22' mounted thereon. The same structure may be provided also on the opposite side. In other examples, each of the two brake pad mounting means 24' provided on one side of the rotor disc 100 may have a different and separate brake pad 22' mounted thereon. The same structure may again be provided also on the opposite side. These configurations may also be interchangeable and/or combinable with each other.

As shown in FIGS. 1 and 3, an actuator 18 is mounted to the "bottom part" of the "U" of the U-shaped housing 12. In some examples, the actuator 18 may be a solenoid. The actuator 18 is connected to a mechanical link, which in this example is a moveable crossbar 15 that extends longitudinally from its first end 15a to its second end 15b which is the bottom part of the "U" of the U-shaped housing. The mechanical link or crossbar 15 is configured to be moved by the actuator 18 in a direction Y that is perpendicular to the longitudinal length L of the crossbar 15. In other words, the solenoid, when activated will pull the crossbar 15 towards itself. The plate 14' provided on the first side of the housing 12 is connected to the first end 15a of the crossbar 15. In a similar manner, the plate 14" that is provided on the second side of the housing 12 is connected to the second end 15b of the crossbar 15. The plates 14', 14" therefore extend in the same direction as the arms of the U-shape. As shown in the figures, the plates 14', 14" are connected to the ends of the crossbar 15 at the third corner 143 of the plates 14', 14". This third corner of the plate 14' is opposite the first side 144 of the plate and is substantially aligned with the pivot point 13.

A spring element or spring elements 16', 16" may also be provided on the outer surface of the housing 12. Referring to FIG. 3, these may be connected at one end 16a to a section of the crossbar 15 that is between the crossbar first and second ends 15a, 15b and at the opposite end 16b to the housing 12. The spring elements 16', 16" may be coil springs, as shown in FIGS. 1 and 3, or any other spring element. A position sensor(s) 20 may also be provided on the movable crossbar 15 to determine the position of the crossbar 15 and therefore also the position of the locking means 14', 14".

As shown in FIG. 3, the actuator 18 has retracted and pulled upon the locking means 14' to pivot the locking means 14' such that hook portions 14a, 14b have disengaged from respective notches 28 so that the brake pads 22', 22" may move to contact the rotor disc 100. As mentioned above, the retraction of the actuator 18 is opposed by the springs 16', 16" which serve to bias the hooks 14a, 14b to engage the notches 28', 28" when it is locked. Thus, if the actuator 18 loses power, either intentionally or unintentionally, the springs 16', 16" bias the locking means 14' so that the hooks 14a, 14b abut the mounts 24'a, 24'b.

As mentioned above, in some examples, position sensors 20 may be mounted to the housing 12 to detect the position of the cross bar 15 and hence detect the position of the locking means 14', 14". The position sensors 20 may send a signal to a control system (not shown) indicating the position of the locking means and hence whether the brake unit 10 is currently prevented from applying a braking force to the rotor disc 100, i.e. is currently in the locked position. The position sensors 20 may take any suitable form and may be provided in any number (including only a single position sensor 20). For example, the position sensors 20 may be LVDT sensors, switches, ultrasonic sensors, etc.

Figure 2A:
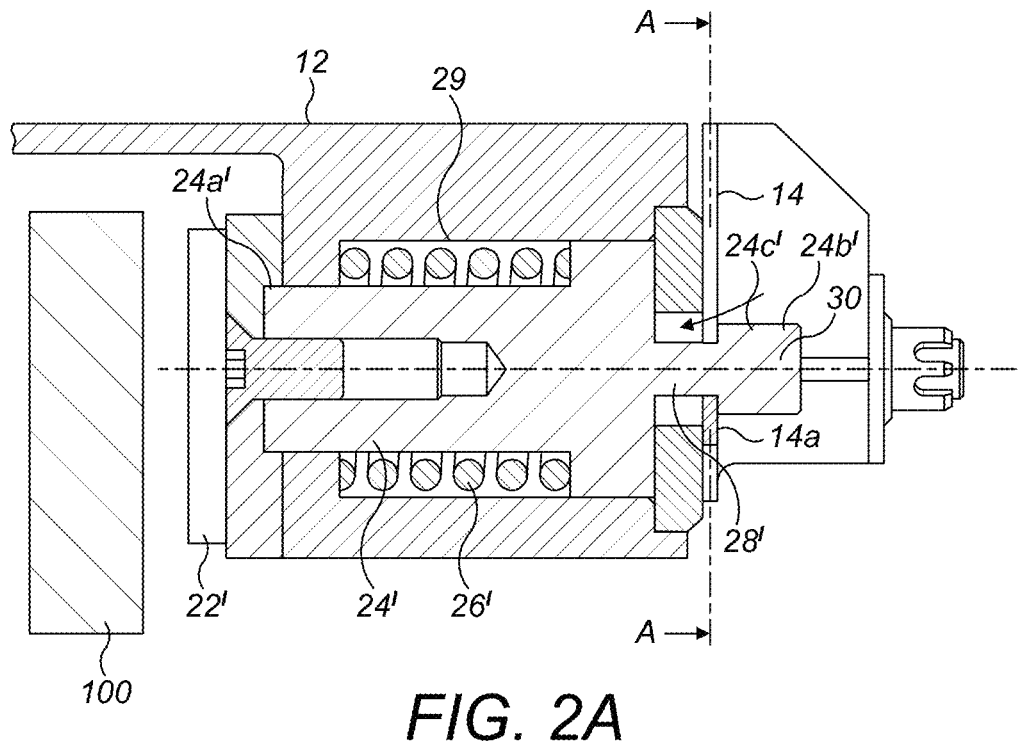
FIG. 2A shows a partial cross-section of the housing of the brake unit.

FIG. 2A shows a cross-section of the housing 12 from one side of the housing 12 to just beyond a mid-point of the housing 12. The housing 12 may house first and second brake pad mounting means 24', 24" (only 24' shown in FIG. 2A) that are disposed on either side of the rotor 100. In FIG. 2A, from left to right, is the rotor disc 100, one of the brake pads 22' (the other brake pad 22", not shown in this Figure, is opposite the first brake pad 22' on the far side of the rotor disc 100), the brake pad mounting means 24', a brake spring 26' for biasing the brake pad away from the rotor disc 100, a notch 28' formed in the brake pad mounting means 24', the locking means 14a, and a portion 30 of the brake pad mounting means 24' that has a greater diameter than the notch 28'.

The brake pad mounting means 24' has a first end 24a' and a second end 24b' and a longitudinal outer, side, surface 24c' extending there between. As can be seen in FIG. 2A the first brake pad 22' is provided at the first end 24a' of the first brake pad mounting means 24' and positioned facing a first face of the rotor disc 100. The brake pad mounting 24' means comprises a first locking feature 28' provided on its outer, side, surface, the locking feature in this case being the notch 28' which has a reduced diameter in comparison to at least the second end 24b' of the brake pad mounting means 24'. It can be seen in FIG. 2A that this notch 28' has a smaller diameter in comparison to the portion 30 of the brake pad mounting means that is provided further towards the second end 24b' of the brake pad mounting means 24'.

Figure 2B:
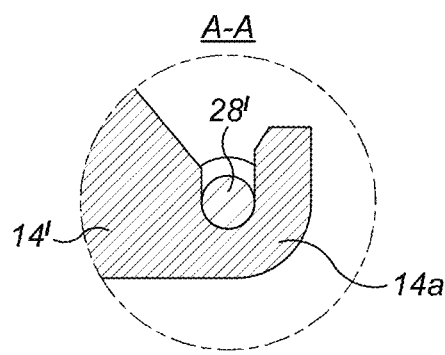
FIG. 2B shows a cross-section along line A-A of FIG. 2A.

FIG. 2B shows a cross section along line A-A of FIG. 2A. FIG. 2B depicts the locking means 14' in a first, locked, position wherein the hook 14a of the locking means 14' is hooked around the notch 28' of the brake pad mounting means 24'. The enlarged portion 30 of the brake pad mounting means 24' abuts the hook 14a and the brake pad mounting means 24' is thereby held in place due to the fact that the portion 30 at the second end 24b has a larger diameter than the notch 28' and so cannot move past this portion 30. As a consequence of this position of the locking means 14', the mount 24' and brake pad 22' may not move inwards so as to contact the rotor disc 100. Thus, the notch 28' provides a locking feature on the outer, side, surface 24c' of the mount 24', with which the locking means 14' may selectively engage.

Thus, in the position shown in FIGS. 1, 2A and 2B the brake unit 10 is in a locked position in which the brake pads 22', 22" may not move to contact the rotor disc 100, even if force is applied to the brake pads 22', 22"/brake mount 24', 24" by, for example, a hydraulic system. This is the desired mode during flight when activation of the brake unit 10 is highly undesirable.

FIG. 3 shows the brake unit 10 in the unlocked mode in which the locking means 14' is moved (pivoted) such that the latch 14a or hooks 14b is/are no longer engaged with the notch 28' or notches. Similarly, since both of the plates 14', 14" are connected to the same cross bar 15, movement of the cross bar 15 by the actuator 18 releases also the hooks on the opposite side of the rotor disc 100. The other latch or hooks 14a', 14b' of the locking means 14" on the opposite side of the rotor disc 100 are therefore also no longer engaged with a notch 28" on another brake pad mounting means. The brake pads 22', 22" are no longer constrained by the locking means 14', 14" from moving to contact the rotor disc 100. A brake biasing means (spring 26') may also be provided in a cavity 29 provided in the arm of the housing 12 so that the spring 26' extends between an inner surface of the housing 12 and a portion of the brake pad mounting means 24' as shown in FIG. 2A. This biasing means may therefore be configured to bias the brake pad 22' away from the rotor disc 100. The brake pads 22', 22" may be moved by a drive system (not shown) to contact the rotor disc 100 and cause braking.

Since the locking means 14', 14" in the examples described herein is a plate, this forms a relatively small and light component of the brake unit 10. Thus the actuator 18 may be correspondingly small and lightweight as it only needs to move the locking means 14', 14" against the bias of the springs 16', 16", and the springs only need to be sufficiently strong to move the locking means 14', 14" when the solenoid is inactive. Put another way, the brake unit 10 as a whole (including housings, brake mounts, brake pads etc.) does not need to be physically moved away from the rotor disc 100 in order to ensure the brake pads 22' cannot come into contact with the rotor disc 100 at an undesirable time (e.g. during flight).

In summary, and as shown in FIG. 2A, the first brake pad mounting means 24' may be described as having a first end 24a' and a second end 24b' and a longitudinal outer, side, surface 24c' extending there between. The first brake pad 22' is provided at the first end 24a' of the first brake pad mounting means 24' and positioned facing a first face of the rotor disc 100. The first brake pad mounting means 24' comprises a first locking feature, i.e. the notch 28', provided on the outer, side, surface 24c'.

A second brake mounting means may also be described as having a first end 24a" and a second end 24b" and a longitudinal outer surface 24c" extending there between. A second brake pad 22" is provided at the first end 24a" of the second brake pad mounting means 24" and positioned facing a second, opposite face of the rotor disc 100. The second brake pad mounting means 24" comprises a second locking feature (e.g. notch 28") provided on its outer, side, surface 24c". The brake unit further comprises first and second locking means 14', 14", each configured to pivot about an axis 13, each locking means 14', 14" being configured to be movable about the pivot axis 13 so that a locking feature (e.g. the hooks 14a, 14b) on each of the locking means 14', 14" can come into contact with, or be moved away from the outer, side, surface 24c', 24c" of each of the first and second brake pad mounting means 24', 24".

Figure 4A:
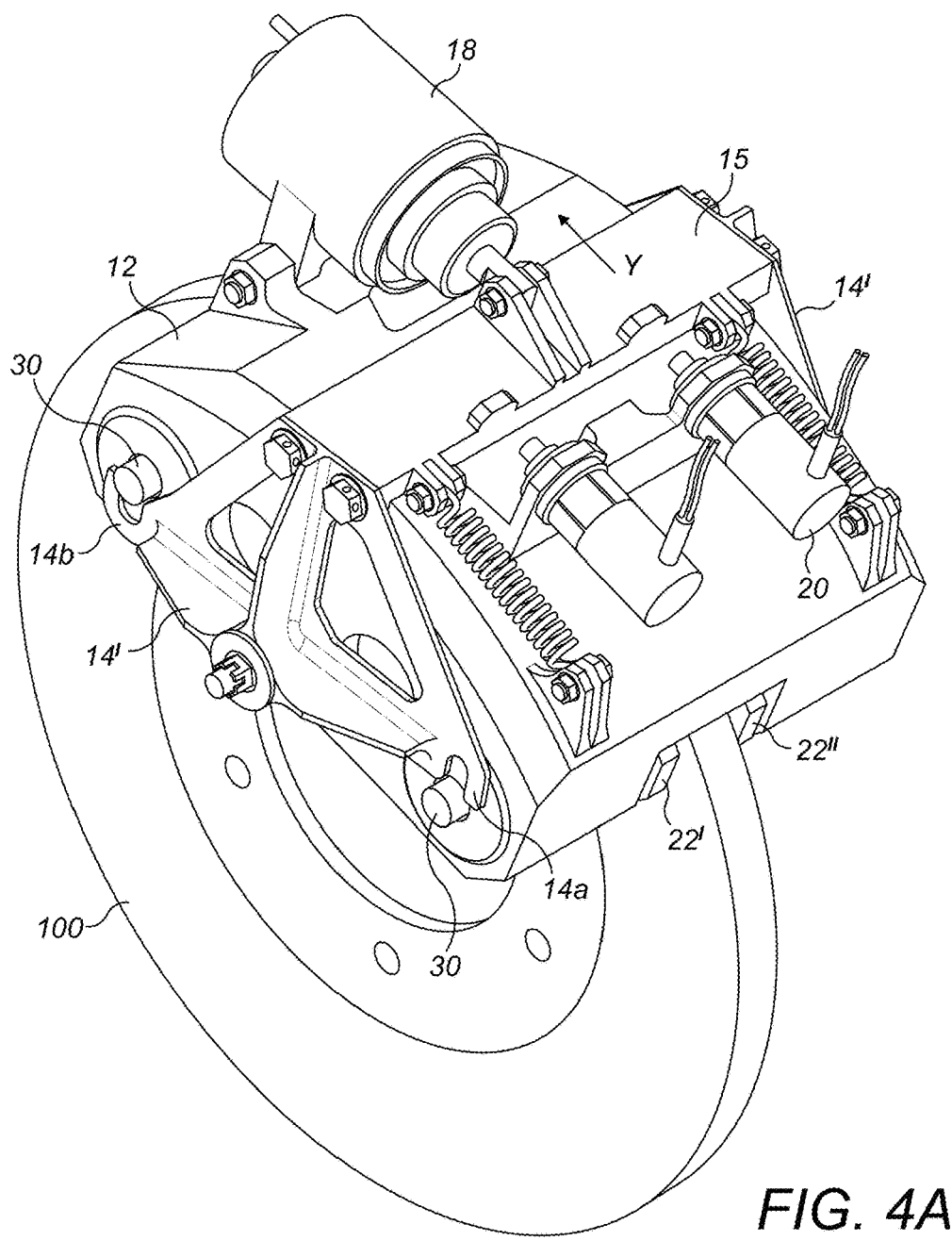
FIG. 4A shows a perspective view of the brake unit while unlocked and the brake pads applied to the rotor position.
Figure 4B:
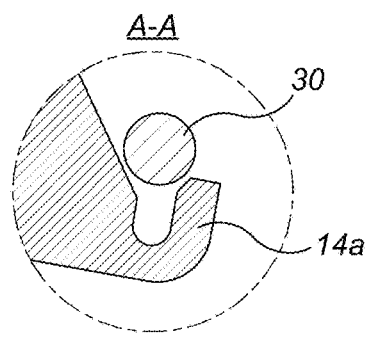
FIG. 4B shows a cross-section depicting the relative position of the hook and the notch in FIG. 4A.

In a first position, the first and second locking features, (e.g. hooks 14a, 14b) of the first and second locking means 14', 14" are configured to be in contact with and engaged with the first and second notches 28',28" of the brake pad mounting means 24', 24" (e.g. as shown for hook 14a in FIGS. 2A and 2B). This thereby prevents movement of the brake pads 22', 22" towards the faces of the rotor disc 100. In contrast to this, and as shown in FIGS. 4A, 4B and 5B, for example, when in a second position, the first and second hooks 14a, 14b are configured to be disengaged from the notches 28 to thereby permit movement of the braking pads 22', 22" towards the faces of the rotor disc 100.

The rotor brake and the way in which it functions will now be described in greater detail.

As mentioned above, the locking means 14' may be connected to the housing 12 at a pivot point 13 that is provided between the first and second corners of the triangular plate 14'. As shown in FIG. 1, the locking means 14' comprises either one, or two locking features 14a, 14b. In this example, the locking features comprise hooks 14a, 14b. These are provided at the first 141 and second 142 corners of the triangular plate 14' respectively (so that the pivot point 13 is provided there between).

Since the plate 14' is also connected to the cross bar 15 at the third corner 143 of the triangular plate 14', when the solenoid is activated, the solenoid 18 pulls the crossbar 15 towards itself, which results in the locking means 14' pivoting about the pivot axis that extends through the pivot point 13. In the example shown in FIG. 4A, it can be seen that, the plate 14' pivots so as to rotate in an anti-clockwise direction. Since the crossbar 15 is being pulled towards the actuator, this provides a tensile force on the spring or springs 16.

Due to this pivoting movement of the plates 14', 14" in the anti-clockwise direction, since the hooks 14a, 14b also curve in the anti-clockwise direction, the hooks are thereby unhooked and released away from the brake pad mounting means 24' as shown in FIG. 4A. Of course, this would be reversed on the other side of the housing and the solenoid would result in movement of the plate in the clockwise direction. The hooks provided on that side would also be curved relative to each other and also relative to the plate so that this clockwise movement of the plate 14" results in the hooks 14a, 14b being moved away from the brake pad mounting means 24" provided on the opposite side of the housing 12 and brake disc 100.

When the actuator 18 has been activated, and the hook 14a is in a second, unlocked, position, and disengaged from the notch 28' (as shown in FIGS. 3, 4A, 4B, 5A and 5B), the brake pad 22' and mounting means 24' are then free to be moved linearly towards the rotor disc 100 so as to come into contact with the rotor disc 100 and cause braking. Movement of the brake pad 22' towards the rotor disc 100 also moves the notch 28' out of alignment with the hook 14a and brings the enlarged portion 30 into alignment with the hook 14a instead.

FIG. 4A shows the brake unit 10 in an engaged position in which the brake pads 22', 22" are squeezed against the rotor disc 100. The locking means 14 is kept in the position shown in FIG. 3, i.e. with the hooks 14a, 14b disengaged from respective notches 28', 28". FIG. 4B shows a view across the same line A-A as used for FIG. 2B. Thus, FIG. 4B shows the hook 14a released from the notch 28'.

Figure 5A:
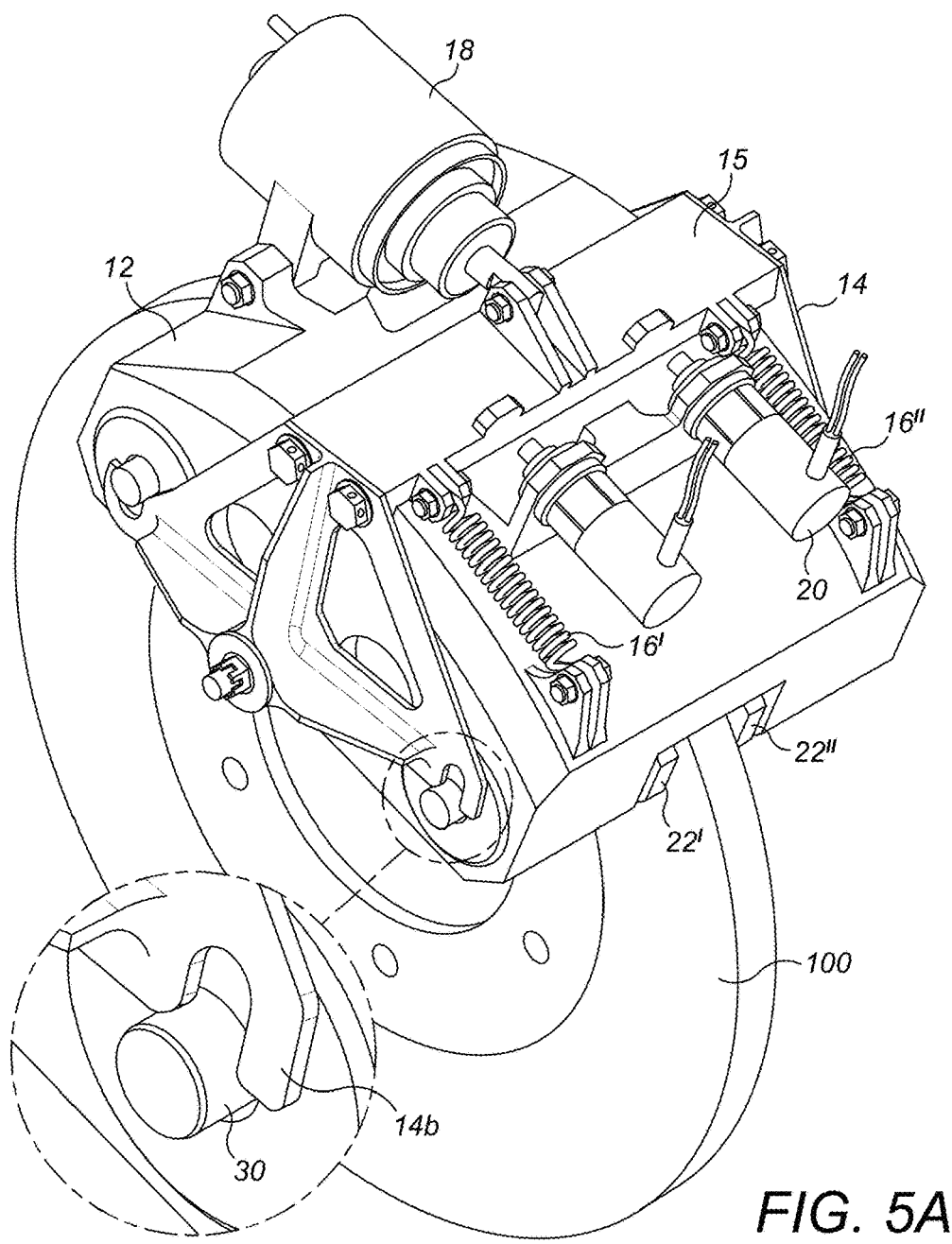
FIG. 5A shows a perspective view and enlarged portion of the brake unit returning to the locked position.
Figure 5B:
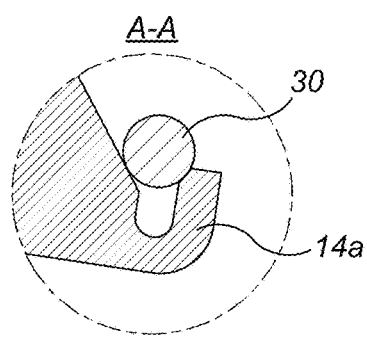
FIG. 5B shows a cross-section depicting the relative position of the hook and the notch in FIG. 5A.

FIG. 5A shows the brake unit 10 in a position where the brake pads 22', 22" are still in contact with the rotor disc 100 and the actuator 18 has been deactivated. Under the bias from the springs 16, the locking means has moved partially back to its original position (i.e. the position of FIG. 1) but it is stopped by the hooks 14a, 14b abutting the enlarged portions 30 of each brake mount 24, as depicted in the enlarged section of FIG. 5A and in FIG. 5B.

In this position, the brake pad 22' and brake mount 24' may move linearly towards and away from the sides of the rotor disc 100, unaffected by the locking means 14'. When the brake unit 10 is disengaged, e.g. when force is no longer applied to the brake mount 24', the brake spring 26' moves the brake pad 22' away from the rotor disc 100. This movement brings the notches 28' back into alignment with the hooks 14a, 14b of the locking means 14'. Thus, each hook 14a, 14b of the locking means 14', under the bias of the springs 16', reengages with its respective notch 28'. This automatically relocks the brake unit 10 such that the brake pads 22' may not move again to contact the rotor disc 100 until the locking means 14' is moved again by the actuator 18.

In some examples, a safety braking system may comprise a drive system coupled to the brake unit 10. This braking system is described as being "safe" because the brake unit 10 has features to prevent the brake pads 22', 22" from engaging the rotor 100 in the event that the drive system is activated at the wrong time (e.g. during flight). In one example, the brake pads 22', 22" may be moved by a hydraulic drive system that presses against the mounts 24', 24" on a side opposite from the brake pads 22', 22".

The present brake unit 10 has been described in the context of a rotary wing aircraft, such as a helicopter; however, the examples are not limited to use in a rotary wing aircraft but may be used in any context in which a safety system for preventing activation of a housing brake against a rotor is desired.

The brake unit 10 disclosed herein does not require an actuator for moving the brake unit on to/off from the rotor. In such devices, the actuator for moving the brake unit can be negatively affected by the high vibrations generated in a helicopter as it supports the entire weight of the brake unit. Further, such devices cannot be moved to a safe position (i.e. locked) without power to the actuator. By contrast, in the brake unit of the present disclosure, the springs 16 can pull the locking means 14', 14" to lock the brake pads 22', 22" when the actuator 18 is unpowered.

Although above and in the figures, movable brake pads are provided on both sides of the rotor disc 100, in another embodiment (not shown), the brake unit 10 may be provided with a static brake pad on one side of the rotor disc 100, (instead of the second brake pad mounting means 24"). The static brake pad may be fixedly mounted to the brake unit 10 and thus cannot move within the brake unit 10. In this embodiment, the rotor disc 100 may be configured to be a floating rotor disc that is movable along its axis of rotation. When braking is not applied to the floating rotor disc, the floating rotor disc may spin freely between the first brake pad mounting means 24' (that is the same as the first brake pad mounting means as described above for the first embodiment) and the static brake pad.

To apply braking force to the floating rotor disc, the first brake pad mounting means 24' may be moved into contact with a first face of the rotor disc, in the manner described above for the first embodiment. When the first brake pad mounting means 24' comes into contact with the first face of the floating rotor disc, it may push against the floating rotor disc to move it axially so that a second, opposite, face of the floating rotor disc comes into contact with the static brake pad. Thus, the floating rotor disc may be braked by being squeezed between the first brake pad mounting means and the static brake pad. As the static brake pad is fixedly mounted to the brake unit, there is no need for any locking means etc. to be provided for the static brake pad. As such, the actuator 18 may only be required to control one locking means 14', that interacts with the first brake pad mounting means 24'.

The invention claimed is:

1. A brake unit for braking a rotor disc, said rotor disk rotatable about a central axis of rotations the unit comprising:
   a first brake pad mounting means having a first end and a second end and a longitudinal outer, side, surface extending there between, wherein a first brake pad is provided at said first end of said first brake pad mounting means and positioned facing a first face of said rotor disc, and wherein said first brake pad mounting means comprises a first brake pad locking feature provided on its said outer, side, surface;
   first locking means configured to pivot about a pivot axis, the first locking means being configured to be movable about said pivot axis so that a locking feature of said locking means can come into contact with, or be moved away from said outer, side, surface of the first brake pad mounting means,
   wherein, in a first position, said first locking means is configured to be in contact with and engaged with said first locking feature, thereby preventing movement of said first brake pad towards said face of said rotor disc, and
   wherein, in a second position, said first locking means is configured to be disengaged from said locking feature to thereby permit movement of said braking pad towards said face of said rotor disc;
a first spring for biasing the locking means to the first position; and
a second spring configured to bias the brake pad away from the rotor disc.

2. The brake unit of claim 1 further comprising:
   a second brake pad mounting means having a first end and a second end and a longitudinal outer surface extending there between,
      wherein a second brake pad is provided at said first end of said second brake pad mounting means and positioned facing a second, opposite face of said rotor disc, and
      wherein said second brake pad mounting means comprises a second brake pad locking feature provided on its said outer, side, surface;
   said brake unit further comprising:
   second locking means configured to pivot about an axis, the second locking means being configured to be movable about said pivot axis so that a locking feature of said second locking means can come into contact with, or be moved away from said outer, side, surface of the second brake pad mounting means,
      wherein, in a first position, said second locking means is configured to be in contact with and engaged with said second locking features, thereby preventing movement of said second brake pad towards said second face of said rotor disc, and
      wherein, in a second position, said second locking means is configured to be disengaged from said locking features to thereby permit movement of said second braking pad towards said second face of said rotor disc.

3. The brake unit of claim 2, wherein the central axis and the pivot axis are parallel to each other.

4. A safety braking system comprising:
   the brake unit of claim 2; and
   a drive system coupled to the brake unit;
      wherein the drive system is configured to apply force to the first and second brake pad mounting means to move the first and second brake pads into contact with the rotor disc.

5. A safety braking system comprising:
   the brake unit of claim 1; and
   a drive system coupled to the brake unit;
      wherein the drive system is configured to apply force to the first brake pad mounting means to move the first brake pad into contact with the rotor disc.

6. The brake unit of claim 1, further comprising a mechanical link to connect the locking means together.

7. The brake unit of claim 1, further comprising an actuator for selectively pivoting the locking means to the second position.

8. The brake unit of claim 7, wherein the actuator is a solenoid.

9. The brake unit of claim 1, further comprising a position sensor for detecting whether the brake unit is in the first position or the second position.

10. The brake unit of claim 1, wherein said locking feature of the locking means comprises a hook and wherein said locking feature of the brake pad mounting means comprises a notch, and wherein movement of the locking means from the first to the second position results in disengagement of the hook with the notch.

11. The brake unit of claim 1 further comprising:
   a static brake pad positioned facing a second, opposite face of said rotor disc,
   wherein said rotor disc is a floating rotor disc configured to be axially movable along its central axis under pressure from the first brake pad mounting means such that when the first brake pad mounting means contacts the floating rotor disc the rotor disc is moved axially into contact with the static brake pad.

12. A method of braking a rotor, the method comprising:
providing the brake unit according to claim 1;
providing a drive system for controlling the movement of the brake pad mounting means when the first locking means are in the second position;
moving the first locking means to the second position; and activating the drive system to move the first brake pads against the rotor.

13. The method of claim 12, further comprising: biasing the brake pad mounting means away from the rotor disc when the drive system is inactive.

14. The method of claim 13, further comprising: biasing the locking means towards the first position such that the locking means become engaged with said first locking feature when the drive system is inactive and the brake pad mounting means are biased away from the rotor disc.

15. The method of claim 14, wherein the brake unit further includes a second brake pad mounting means having a first end and a second end and a longitudinal outer surface extending there between, wherein a second brake pad is provided at said first end of said second brake pad mounting means and positioned facing a second, opposite face of said rotor disc, and wherein said second brake pad mounting means comprises a second brake pad locking feature provided on its said outer, side, surface;

said brake unit further comprising:

second locking means configured to pivot about an axis, the second locking means being configured to be movable about said pivot axis so that a locking feature of said second locking means can come into contact with, or be moved away from said outer, side, surface of the second brake pad mounting means, wherein, in a first position of said second locking means, said second locking means is configured to be in contact with and engaged with said second locking features, thereby preventing movement of said second brake pad towards said second face of said rotor disc, and wherein, in a second position of said second locking means, said second locking means is configured to be disengaged from said locking features to thereby permit movement of said second braking pad towards said second face of said rotor disc, wherein the drive system for controlling the movement of the first and second brake pad mounting means when the first and second locking means are in the second position;

wherein moving includes moving the first and second locking means to the second position; and wherein activating includes activating the drive system to move the first and second brake pads against the rotor.

\* \* \* \* \*